(12) United States Patent
Christel et al.

(10) Patent No.: US 10,598,550 B2
(45) Date of Patent: Mar. 24, 2020

(54) RADIOMETRIC CORRECTION AND ALIGNMENT TECHNIQUES FOR THERMAL IMAGER WITH NON-CONTACT TEMPERATURE SENSOR

(71) Applicant: FLIR SYSTEMS, INC., Wilsonville, OR (US)

(72) Inventors: Roderick C. Christel, Lompoc, CA (US); Theodore R. Hoelter, Goleta, CA (US); Per Elmfors, Goleta, CA (US)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 15/898,167

(22) Filed: Feb. 15, 2018

(65) Prior Publication Data

US 2018/0238740 A1   Aug. 23, 2018

Related U.S. Application Data

(60) Provisional application No. 62/460,674, filed on Feb. 17, 2017.

(51) Int. Cl.
| | |
|---|---|
| *G01J 5/10* | (2006.01) |
| *G01J 5/52* | (2006.01) |
| *H04N 5/33* | (2006.01) |
| *G01J 5/08* | (2006.01) |
| *G01J 5/02* | (2006.01) |
| *G01J 5/20* | (2006.01) |
| *G01J 5/00* | (2006.01) |

(52) U.S. Cl.
CPC ............ *G01J 5/10* (2013.01); *G01J 5/026* (2013.01); *G01J 5/0275* (2013.01); *G01J 5/0834* (2013.01); *G01J 5/20* (2013.01); *G01J 5/522* (2013.01); *G01J 5/524* (2013.01); *H04N 5/33* (2013.01); *G01J 2005/0048* (2013.01); *G01J 2005/0077* (2013.01)

(58) Field of Classification Search
CPC ........................ G01J 2005/0048; H04N 5/33
See application file for complete search history.

(56) References Cited

U.S. PATENT DOCUMENTS

| | | | | |
|---|---|---|---|---|
| 2005/0157772 A1* | 7/2005 | Fischer | ............ | B60H 1/00792 |
| | | | | 374/131 |
| 2013/0284927 A1* | 10/2013 | Kryskowski | .............. | G01J 5/10 |
| | | | | 250/338.1 |

(Continued)

*Primary Examiner* — Yara B Green
(74) *Attorney, Agent, or Firm* — Haynes and Boone, LLP

(57) ABSTRACT

Various techniques are provided for calibrating a thermal imaging device using a non-contact temperature sensor. In one example, a method includes capturing a thermal image of a scene. The thermal image comprises a plurality of pixel values. The method also includes detecting, by a non-contact temperature sensor, a temperature value associated with a portion of the scene corresponding to a subset of the pixel values. The method also includes comparing the subset of pixel values with the detected temperature value. The method also includes generating a correction term based on the comparing. The method also includes applying the correction term to at least the subset of pixel values to radiometrically calibrate the subset of pixel values. Related systems and alignment processes are also provided.

20 Claims, 7 Drawing Sheets

(56) References Cited

U.S. PATENT DOCUMENTS

| | | | |
|---|---|---|---|
| 2013/0306851 A1* | 11/2013 | Le Noc | G01J 5/026 |
| | | | 250/252.1 |
| 2013/0314536 A1* | 11/2013 | Frank | H04N 5/33 |
| | | | 348/148 |
| 2014/0085482 A1* | 3/2014 | Teich | H04N 5/3696 |
| | | | 348/164 |
| 2014/0232875 A1 | 8/2014 | Boulanger et al. | |
| 2016/0018266 A1* | 1/2016 | Hodgins | G01J 5/10 |
| | | | 250/252.1 |
| 2016/0292826 A1* | 10/2016 | Beall | G06T 7/80 |
| 2017/0006237 A1* | 1/2017 | Rud | H04N 5/33 |
| 2017/0374298 A1 | 12/2017 | Teich et al. | |

* cited by examiner

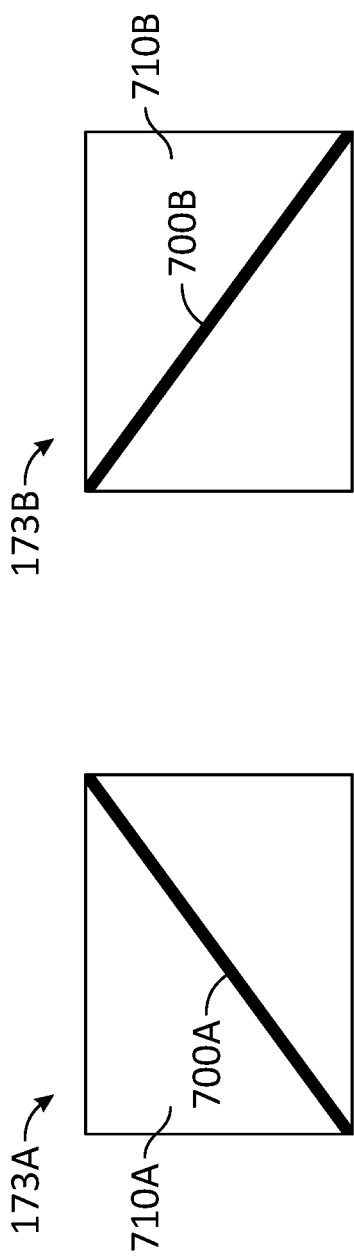
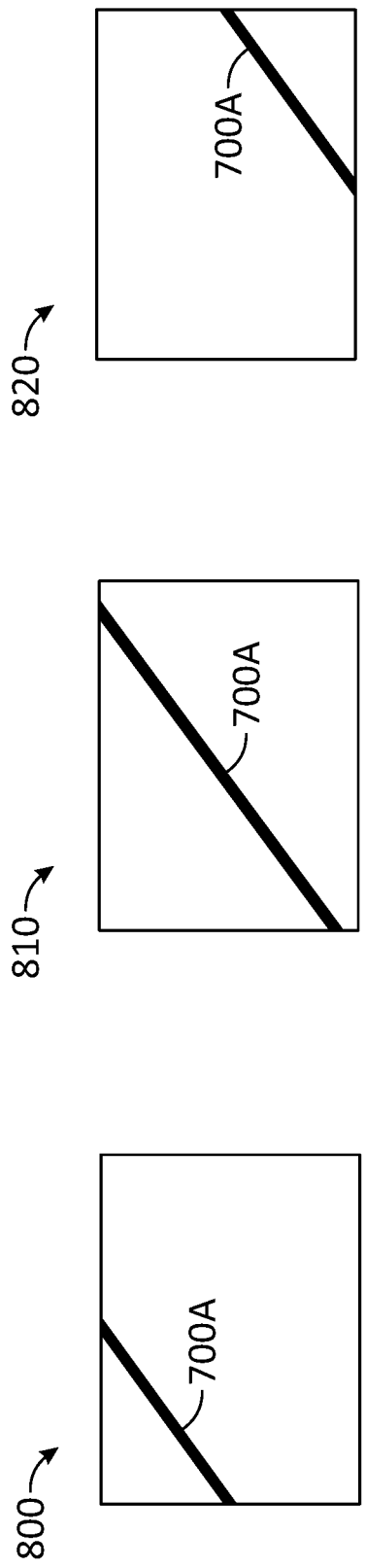

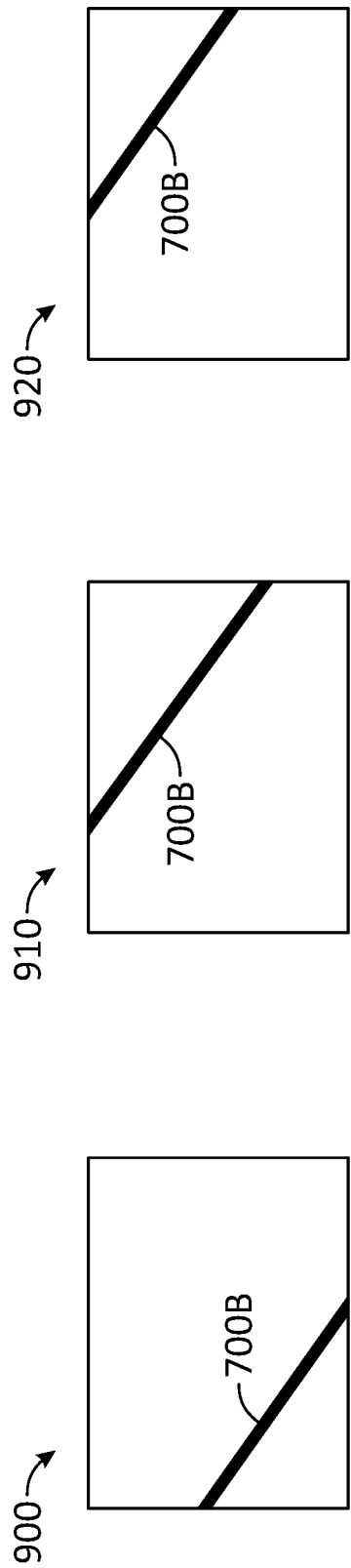
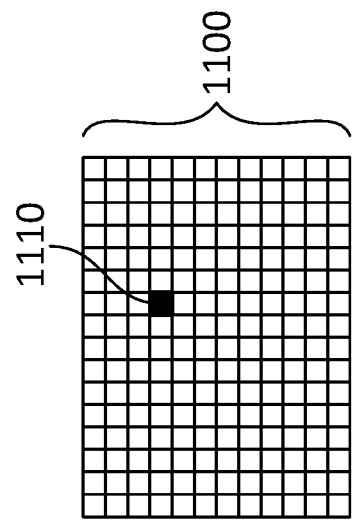
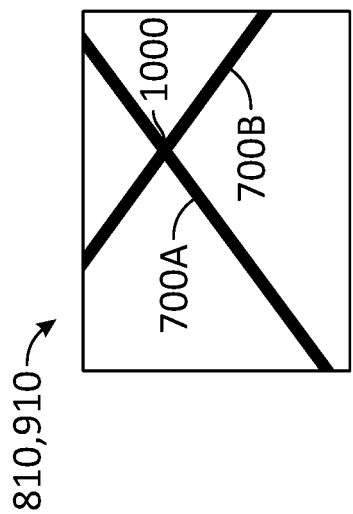

RADIOMETRIC CORRECTION AND ALIGNMENT TECHNIQUES FOR THERMAL IMAGER WITH NON-CONTACT TEMPERATURE SENSOR

CROSS REFERENCE TO RELATED APPLICATIONS

This application claims the benefit of and priority to U.S. Provisional Patent Application No. 62/460,674 filed Feb. 17, 2017 and entitled "RADIOMETRIC CORRECTION AND ALIGNMENT TECHNIQUES FOR THERMAL IMAGER WITH NON-CONTACT TEMPERATURE SENSOR" which is incorporated herein by reference in its entirety.

TECHNICAL FIELD

The present invention relates generally to thermal imaging and, more particularly, to calibration techniques for thermal imagers.

BACKGROUND

Thermal imaging devices are frequently implemented with microbolometer infrared detectors provided, for example, in a focal plane array (FPA). Each microbolometer may be associated with a corresponding pixel of a captured image. Incident radiation received by each bolometer causes a resulting voltage to be captured during an image sampling period. The voltage is converted to a pixel value (e.g., pixel count) associated with the individual pixel.

Although microbolometers are effective infrared detectors, they typically require radiometric calibration to ensure that the captured pixel values properly correlate to temperatures of an imaged scene. For example, the performance of individual microbolometers and their associated circuitry may be evaluated at the factory during the time of manufacture to determine various correction terms to accurately correlate pixel counts with actual scene temperatures such that captured images are radiometrically calibrated.

Unfortunately, although microbolometers may be precisely calibrated at the factory, their performance can vary over time (e.g., ranging from seconds to months). If left uncorrected, these variations can lead to errors in radiometric accuracy.

In one corrective approach, local sensors are used to take temperature measurements of the FPA or other portions of the imaging device itself. These temperature measurements may be used by appropriate predictive processes to select various correction terms to compensate for changing microbolometer performance at different temperatures. However, such predictive processes may have limited accuracy and can require the implementation of multiple temperature sensors that may be difficult to implement.

In another corrective approach, a shutter providing a uniform black body of a known temperature may be intermittently introduced in front of the FPA to calibrate the microbolometers. Although this is generally effective, such an approach complicates the implementation of the imaging device with additional cost and development time, increased size and weight, and the possibility of shutter mechanical failure. Moreover, if additional components (e.g., optical elements such as lenses and/or protective windows) are provided between the imaged scene and the shutter, then such an approach may not account for radiometric variations attributable to such additional components.

SUMMARY

Improved techniques for calibrating a thermal imaging device are provided using a non-contact temperature sensor configured to determine the temperature of at least a portion of an imaged scene. By reliably determining an actual (i.e., not relative) temperature of a portion of the scene, one or more correction terms (e.g., arithmetic additions or subtractions and/or gain values) may be generated and applied to the pixel values of captured thermal images. As a result, reliable radiometrically calibrated images may be provided. Additional techniques are provided to determine an alignment of the non-contact temperature sensor relative to the imaged scene.

In one embodiment, a method includes capturing a thermal image of a scene, wherein the thermal image comprises a plurality of pixel values; detecting, by a non-contact temperature sensor, a temperature value associated with a portion of the scene corresponding to a subset of the pixel values; comparing the subset of pixel values with the detected temperature value; generating a correction term based on the comparing; and applying the correction term to at least the subset of pixel values to radiometrically calibrate the subset of pixel values.

In another embodiment, a system includes an array of infrared sensors configured to capture a thermal image of a scene, wherein the thermal image comprises a plurality of pixel values; a non-contact temperature sensor configured to detect a temperature value associated with a portion of the scene corresponding to a subset of the pixel values; a memory component storing machine-executable instructions; and a processor configured to execute the instructions to cause the system to: compare the subset of pixel values with the detected temperature value, generate a correction term based on the comparing, and apply the correction term to at least the subset of pixel values to radiometrically calibrate the subset of pixel values.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 7A-7B illustrate alignment targets used to determine an alignment of a temperature sensor in accordance with embodiments of the disclosure.

FIGS. 8A-C and 9A-C illustrate thermal images captured of alignment targets in accordance with embodiments of the disclosure.

FIG. 10 illustrates an intersection between thermal images corresponding to an alignment of a temperature sensor in accordance with an embodiment of the disclosure.

FIG. 11 illustrates a pixel location corresponding to a field of view of a temperature sensor in accordance with an embodiment of the disclosure.

Embodiments of the present invention and their advantages are best understood by referring to the detailed description that follows. It should be appreciated that like reference numerals are used to identify like elements illustrated in one or more of the figures.

DETAILED DESCRIPTION

In accordance with several embodiments disclosed herein, a non-contact temperature sensor (e.g., pyrometer, thermopile, thermocouple, and/or other appropriate sensor) having a field of view corresponding to a narrow solid angle is provided with an imaging system also having a thermal imager (e.g., a microbolometer-based array of infrared sensors) such that their detection areas overlap. The apparent radiance or temperature of the area of overlap is measured by the temperature sensor and the thermal imager simultaneously. The temperatures are compared, and their difference is used to create a global correction term that may be applied to thermal images captured by the thermal imager to nullify the difference.

In some embodiments, measurements of significantly different temperatures at different times may be used to generate and apply a global correction term when available. These factors may be used directly or combined with other processes to achieve improved accuracy for the thermal imager. In particular, all infrared sensors of the thermal imager may effectively be radiometrically calibrated without the need for additional components and related circuitry conventionally used for in-field calibration such as, for example, additional temperature sensors to measure lens temperature, shutter blade temperature, and other portions of the imaging system. Moreover, in some embodiments, post-manufacture secondary calibrations of black body targets may be eliminated in factor of the radiometric calibration techniques disclosed herein.

In some embodiments, a shutter need not be implemented in the imaging system, as radiometric calibration may be performed using the techniques disclosed herein without a shutter. Moreover, scene-based non-uniformity correction techniques may be further applied to the captured thermal images, further eliminating the need for a shutter.

The calibration techniques discussed herein may be used in a wide range of environments and applications. In particular, improved radiometric accuracy can be used to more precisely identify local variations in temperature, particularly where absolute temperature values, rather than relative temperature values are desired (e.g., when monitoring critical equipment or a human being experiencing a fever).

Figure 1:
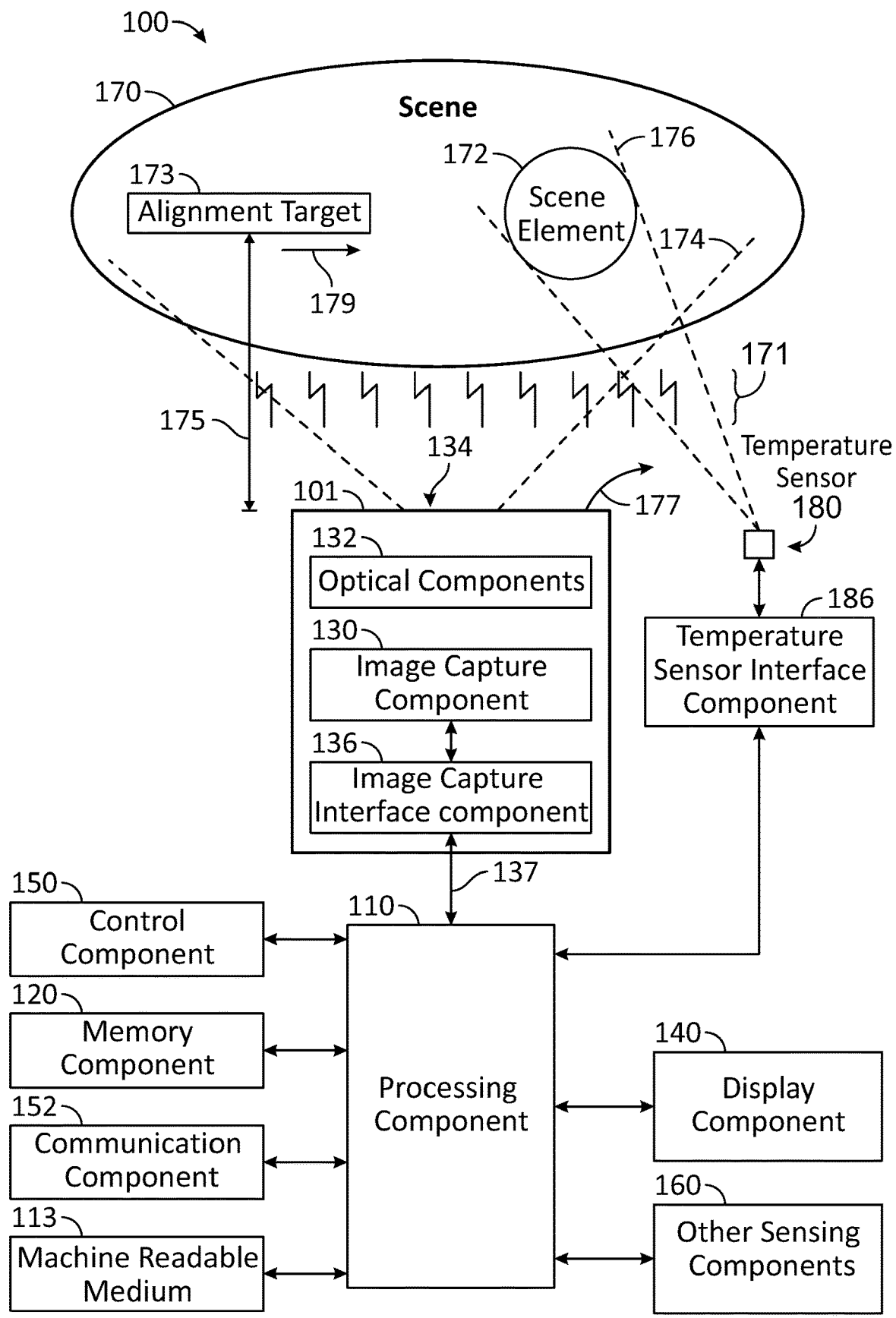
FIG. 1 illustrates a block diagram of an imaging system in accordance with an embodiment of the disclosure.

Turning now to the drawings, FIG. 1 illustrates a block diagram of an imaging system 100 in accordance with an embodiment of the disclosure. Imaging system 100 may be used to capture and process images (e.g., image frames) captured of scene 170 that includes one or more scene targets 172 and/or one or more alignment targets 173 in accordance with techniques described herein. Imaging system 100 may also be used to detect temperature values of portions of scene 170, such as the temperature values of one or more scene targets 172 and/or one or more alignment targets 173. In some embodiments, scene element 172 and/or alignment target 173 may be positioned at a known distance 175 from imaging system 100 to aid in the calibration and/or alignment of various components as further discussed herein. Alignment target 173 may be translated across scene 170, for example, in the direction of arrow 179.

In some embodiments, imaging system 100 may be implemented as a thermal imaging camera, such as camera component 101 as shown. In other embodiments, one or more components of imaging system 100 may be implemented remotely from each other in a distributed fashion (e.g., networked or otherwise).

Captured images may be received by a processing component 110 and stored in a memory component 120. Processing component 110 may be configured to process the captured images in accordance with various techniques discussed herein.

In some embodiments, imaging system 100 includes processing component 110, a machine readable medium 113, a memory component 120, image capture component 130, optical components 132 (e.g., one or more lenses configured to receive electromagnetic radiation 171 through an aperture 134 in camera component 101), an image capture interface component 136, a display component 140, a control component 150, a communication component 152, other sensing components 160, a temperature sensor 180, and a temperature sensor interface component 186.

Camera component 101 may receive radiation 171 (e.g., including radiation in infrared and thermal wavelengths) from scene 170 over a field of view (FOV) 174 of image capture component 130. In some embodiments, camera component 101 may include image capture component 130, optical components 132, and image capture interface component 136 housed in a protective enclosure. Camera component 101 may be implemented by any type of camera system which, for example, detects radiation 171 and provides representative data (e.g., one or more still images or video images). For example, in various embodiments, camera component 101 may detect infrared radiation and/or visible light and provide associated image data.

Temperature sensor 180 receives radiation 171 from scene 170 over a FOV 176. In various embodiments, temperature sensor 180 may be implemented as a non-contact temperature sensor (e.g., pyrometer, thermopile, thermocouple, and/or other appropriate sensor providing spot metering).

As shown in FIG. 1, FOV 176 of temperature sensor 180 overlaps with and is narrower than FOV 174 of camera component 101. The center of FOV 176 corresponds to a horizontal pointing angle 177 and a vertical pointing angle (not shown). Accordingly, temperature sensor 180 provides a measured temperature value of a portion of scene 170 (e.g., along the associated pointing angles of FOV 176) that is a subset of the images captured by camera component 101.

Temperature values captured by temperature sensor 180 are provided to processing component 110 through temperature sensor interface component 186. As further discussed herein, the temperature values may be used by processing component 110 to determine one or more correction terms applied to the pixel values of captured images to provide reliable radiometrically calibrated images.

In some embodiments, imaging system 100 may be implemented as a portable device and may be, for example, coupled to various types of vehicles (e.g., an automobile, a truck, or other land-based vehicles). Imaging system 100 may be implemented with camera component 101 at various types of fixed scenes (e.g., automobile roadway, train railway, or other scenes) via one or more types of structural mounts. In some embodiments, camera component 101 may be mounted in a stationary arrangement to capture repetitive images of scene 170.

In some embodiments, processing component 110 may include, for example, a microprocessor, a single-core processor, a multi-core processor, a microcontroller, a logic device (e.g., a programmable logic device configured to perform processing operations), a digital signal processing (DSP) device, one or more memories for storing executable instructions (e.g., software, firmware, or other instructions), and/or any other appropriate combinations of processing device and/or memory to execute instructions to perform any of the various operations described herein. Processing component 110 is configured to interface and communicate with the various components illustrated in FIG. 1 to perform method and processing operations as described herein. In various embodiments, it should be appreciated that processing operations and/or instructions may be integrated in software and/or hardware as part of processing component 110, or code (e.g., software or configuration data) which may be stored in memory component 120. Embodiments of processing operations and/or instructions disclosed herein may be stored by machine readable medium 113 in a non-transitory manner (e.g., a memory, a hard drive, a compact disk, a digital video disk, or a flash memory) to be executed by a computer (e.g., logic or processor-based system) to perform various methods disclosed herein.

In various embodiments, the machine readable medium 113 may be included as part of imaging system 100 and/or separate from imaging system 100, with stored instructions provided to imaging system 100 by coupling the machine readable medium 113 to imaging system 100 and/or by imaging system 100 downloading (e.g., via a wired or wireless link) the instructions from the machine readable medium (e.g., containing the non-transitory information). In various embodiments, as described herein, instructions provide for real time applications of processing various images of scene 170.

In some embodiments, memory component 120 may include one or more memory devices (e.g., one or more memories) to store data and information. The one or more memory devices may include various types of memory including volatile and non-volatile memory devices, such as RAM (Random Access Memory), ROM (Read-Only Memory), EEPROM (Electrically-Erasable Read-Only Memory), flash memory, or other types of memory. In some embodiments, processing component 110 is configured to execute software stored in memory component 120 and/or machine readable medium 113 to perform various methods, processes, and operations in a manner as described herein.

In some embodiments, image capture component 130 may include an array of sensors (e.g., any type visible light, infrared, or other type of detector) for capturing images of scene 170. In one embodiment, the sensors of image capture component 130 provide for representing (e.g., converting) a captured images of scene 170 as digital data (e.g., via an analog-to-digital converter included as part of the sensor or separate from the sensor as part of imaging system 100).

In some embodiments, processing component 110 may be configured to receive images from image capture component 130, process the images, store the original and/or processed images in memory component 120, and/or retrieve stored images from memory component 120. In various aspects, processing component 110 may be remotely positioned, and processing component 110 may be configured to remotely receive images from image capture component 130 via wired or wireless communication with image capture interface component 136, as described herein. Processing component 110 may be configured to process images stored in memory component 120 to provide images (e.g., captured and/or processed images) to display component 140 for viewing by a user.

In some embodiments, display component 140 may include an image display device (e.g., a liquid crystal display (LCD)) or various other types of generally known video displays or monitors. Processing component 110 may be configured to display image data and information on display component 140. Processing component 110 may be configured to retrieve image data and information from memory component 120 and display any retrieved image data and information on display component 140. Display component 140 may include display electronics, which may be utilized by processing component 110 to display image data and information. Display component 140 may receive image data and information directly from image capture component 130 via processing component 110, or the image data and information may be transferred from memory component 120 via processing component 110.

In some embodiments, control component 150 may include a user input and/or interface device having one or more user actuated components, such as one or more push buttons, slide bars, rotatable knobs or a keyboard, that are configured to generate one or more user actuated input control signals. Control component 150 may be configured to be integrated as part of display component 140 to operate as both a user input device and a display device, such as, for example, a touch screen device configured to receive input signals from a user touching different parts of the display screen. Processing component 110 may be configured to sense control input signals from control component 150 and respond to any sensed control input signals received therefrom.

In some embodiments, control component 150 may include a control panel unit (e.g., a wired or wireless handheld control unit) having one or more user-activated mechanisms (e.g., buttons, knobs, sliders, or others) configured to interface with a user and receive user input control signals. In various embodiments, it should be appreciated that the control panel unit may be configured to include one or more other user-activated mechanisms to provide various other control operations of imaging system 100, such as auto-focus, menu enable and selection, FOV, brightness, contrast, gain, offset, spatial, temporal, and/or various other features and/or parameters.

In some embodiments, control component 150 may include a graphical user interface (GUI), which may be integrated as part of display component 140 (e.g., a user actuated touch screen), having one or more images of the user-activated mechanisms (e.g., buttons, knobs, sliders, or others), which are configured to interface with a user and receive user input control signals via the display component 140. As an example for one or more embodiments as discussed further herein, display component 140 and control component 150 may represent appropriate portions of a tablet, a laptop computer, a desktop computer, or other type of device.

In some embodiments, processing component 110 may be configured to communicate with image capture interface component 136 (e.g., by receiving data and information from image capture component 130). Image capture interface component 136 may be configured to receive images from image capture component 130 and communicate the images to processing component 110 directly or through one or more wired or wireless communication components (e.g., represented by connection 137) in the manner of communication component 152 further described herein. Camera component 101 and processing component 110 may be positioned proximate to or remote from each other in various embodiments.

In some embodiments, imaging system 100 may include one or more other types of sensing components 160, including environmental and/or operational sensors, depending on the sensed application or implementation, which provide information to processing component 110 (e.g., by receiving sensor information from each sensing component 160). In various embodiments, other sensing components 160 may be configured to provide data and information related to environmental conditions, such as internal and/or external temperature conditions, lighting conditions (e.g., day, night, dusk, and/or dawn), humidity levels, specific weather conditions (e.g., sun, rain, and/or snow), distance (e.g., a laser rangefinder or other rangefinder type), and/or whether a tunnel, a covered parking garage, or that some type of enclosure has been entered or exited. Accordingly, other sensing components 160 may include one or more conventional sensors as would be known by those skilled in the art for monitoring various conditions (e.g., environmental conditions) that may have an effect (e.g., on the image appearance) on the data provided by image capture component 130.

In some embodiments, other sensing components 160 may include devices that relay information to processing component 110 via wireless communication. For example, each sensing component 160 may be configured to receive information from a satellite, through a local broadcast (e.g., radio frequency) transmission, through a mobile or cellular network and/or through information beacons in an infrastructure (e.g., a transportation or highway information beacon infrastructure) or various other wired or wireless techniques.

In some embodiments, communication component 152 may be implemented as a network interface component (NIC) configured for communication with a network including other devices in the network. In various embodiments, communication component 152 may include one or more wired or wireless communication components, such as an Ethernet connection, a wireless local area network (WLAN) component based on the IEEE 802.11 standards, a wireless broadband component, mobile cellular component, a wireless satellite component, or various other types of wireless communication components including radio frequency (RF), microwave frequency (MWF), and/or infrared frequency (IRF) components configured for communication with a network. As such, communication component 152 may include an antenna coupled thereto for wireless communication purposes. In other embodiments, the communication component 152 may be configured to interface with a DSL (e.g., Digital Subscriber Line) modem, a PSTN (Public Switched Telephone Network) modem, an Ethernet device, and/or various other types of wired and/or wireless network communication devices configured for communication with a network.

In some embodiments, a network may be implemented as a single network or a combination of multiple networks. For example, in various embodiments, the network may include the Internet and/or one or more intranets, landline networks, wireless networks, and/or other appropriate types of communication networks. In another example, the network may include a wireless telecommunications network (e.g., cellular phone network) configured to communicate with other communication networks, such as the Internet. As such, in various embodiments, imaging system 100 and/or its individual associated components may be associated with a particular network link such as for example a URL (Uniform Resource Locator), an IP (Internet Protocol) address, and/or a mobile phone number.

Figure 2:
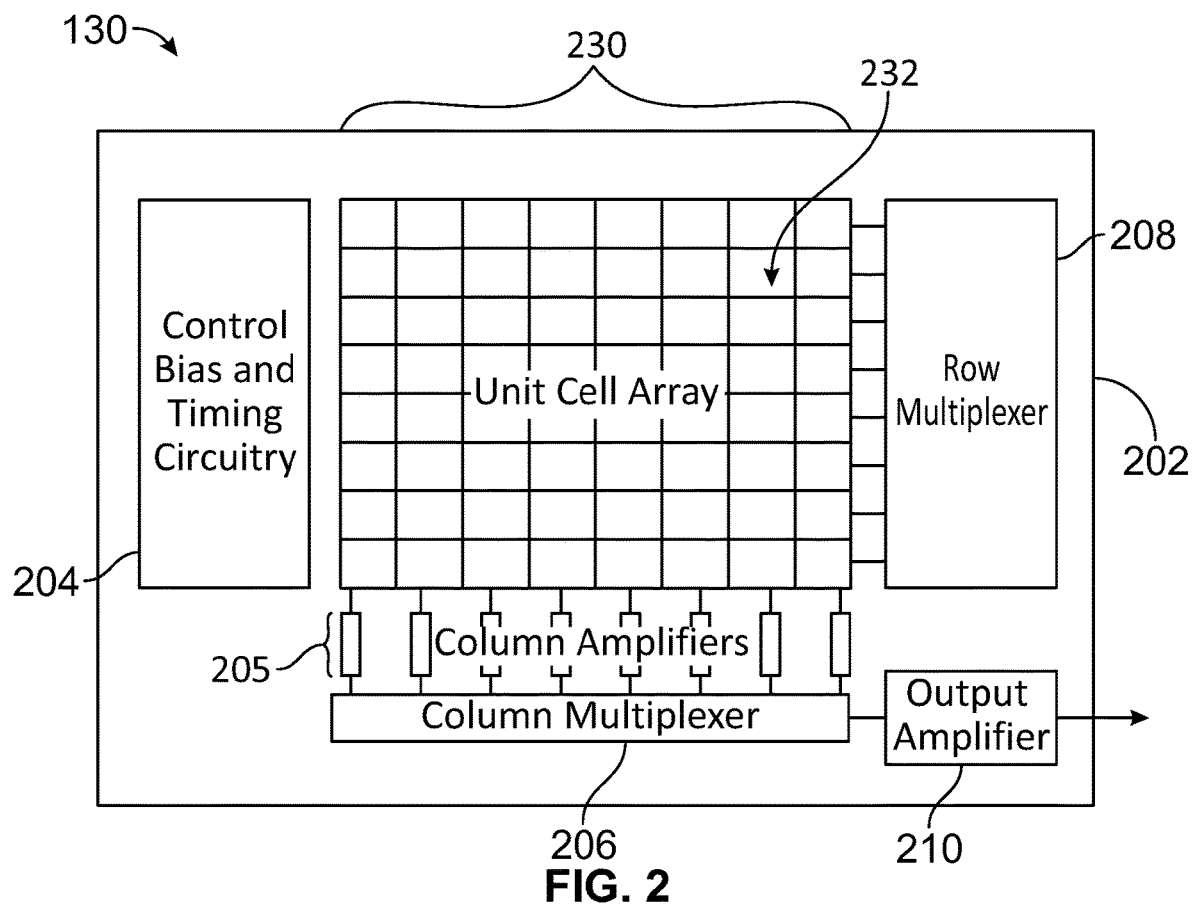
FIG. 2 illustrates a block diagram of an image capture component in accordance with an embodiment of the disclosure.

FIG. 2 illustrates a block diagram of image capture component 130 in accordance with an embodiment of the disclosure. In this illustrated embodiment, image capture component 130 is a focal plane array (FPA) including a sensor array 230 of infrared sensors 232 (e.g., implemented as unit cells) and a read out integrated circuit (ROIC) 202. Although an 8 by 8 array of infrared sensors 232 is shown, this is merely for purposes of example and ease of illustration. Any desired sensor array size may be used as desired.

Each infrared sensor 232 may be implemented, for example, by an infrared detector such as a microbolometer and associated circuitry to provide image data (e.g., a data value associated with a captured voltage) for a pixel of a captured thermal image. In this regard, time-multiplexed electrical signals may be provided by the infrared sensors 232 to ROIC 202. As further discussed herein, infrared sensors 232 may be associated with corresponding filters to permit at least two differently filtered images to be captured.

ROIC 202 includes bias generation and timing control circuitry 204, column amplifiers 205, a column multiplexer 206, a row multiplexer 208, and an output amplifier 210. Images captured by infrared sensors 232 may be provided by output amplifier 210 to processing component 110 and/or any other appropriate components to perform various processing techniques described herein. Further descriptions of ROICs and infrared sensors (e.g., microbolometer circuits) may be found in U.S. Pat. No. 6,028,309 issued Feb. 22, 2000, which is incorporated herein by reference in its entirety.

Figure 3:
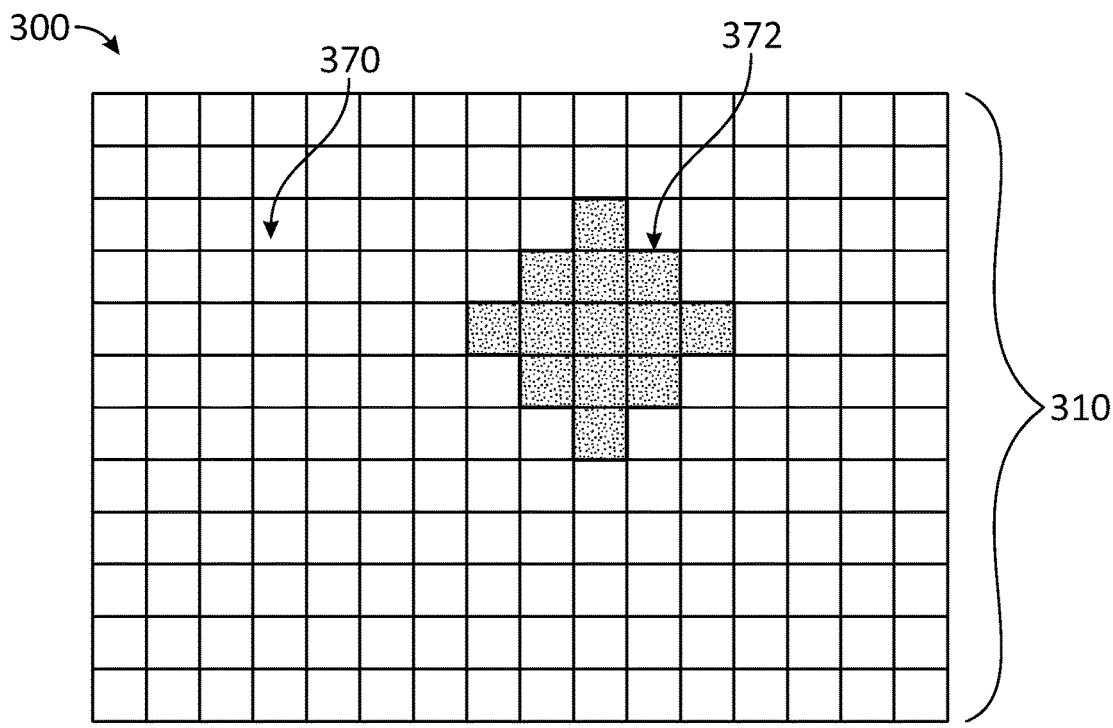
FIG. 3 illustrates a thermal image captured of a scene and a scene target in accordance with an embodiment of the disclosure.

FIG. 3 illustrates a thermal image 300 captured by image capture component 130 (e.g., when implemented by various infrared sensors 232) and provided to processing component 110 in accordance with an embodiment of the disclosure. As shown, image 300 includes a plurality of pixels 310 arranged in rows and columns, with each pixel 310 corresponding to one of infrared sensors 232 of image capture component 130. Although an array of 12 rows by 16 columns is illustrated, any desired arrangement and number of pixels may be used.

Thermal image 300 corresponds to a portion of scene 170 within FOV 174 of image capture component 130. Accordingly, as shown in FIG. 3, a majority 370 of pixels 310 correspond to empty background portions of scene 170, while a subset 372 of pixels 310 correspond to scene element 172. As shown in FIG. 1, the FOV 176 of temperature sensor 180 generally corresponds to scene element 172.

Accordingly, image capture component 130 may capture thermal image 300 of scene 170 including pixels 370 having pixel values corresponding to background portions of scene 170 generally, and pixels 372 having pixel values corresponding to scene element 172. Meanwhile, temperature sensor 180 may capture one or more temperature values associated with scene element 172 (e.g., simultaneously and/or substantially contemporaneously with the capture of thermal image 300 by image capture component 130). As further discussed herein, processing component 110 may use one or more of the pixel values and one or more of the temperature values to determine one or more correction terms to adjust the pixel values of thermal image 300 to be radiometrically calibrated.

Figure 4:
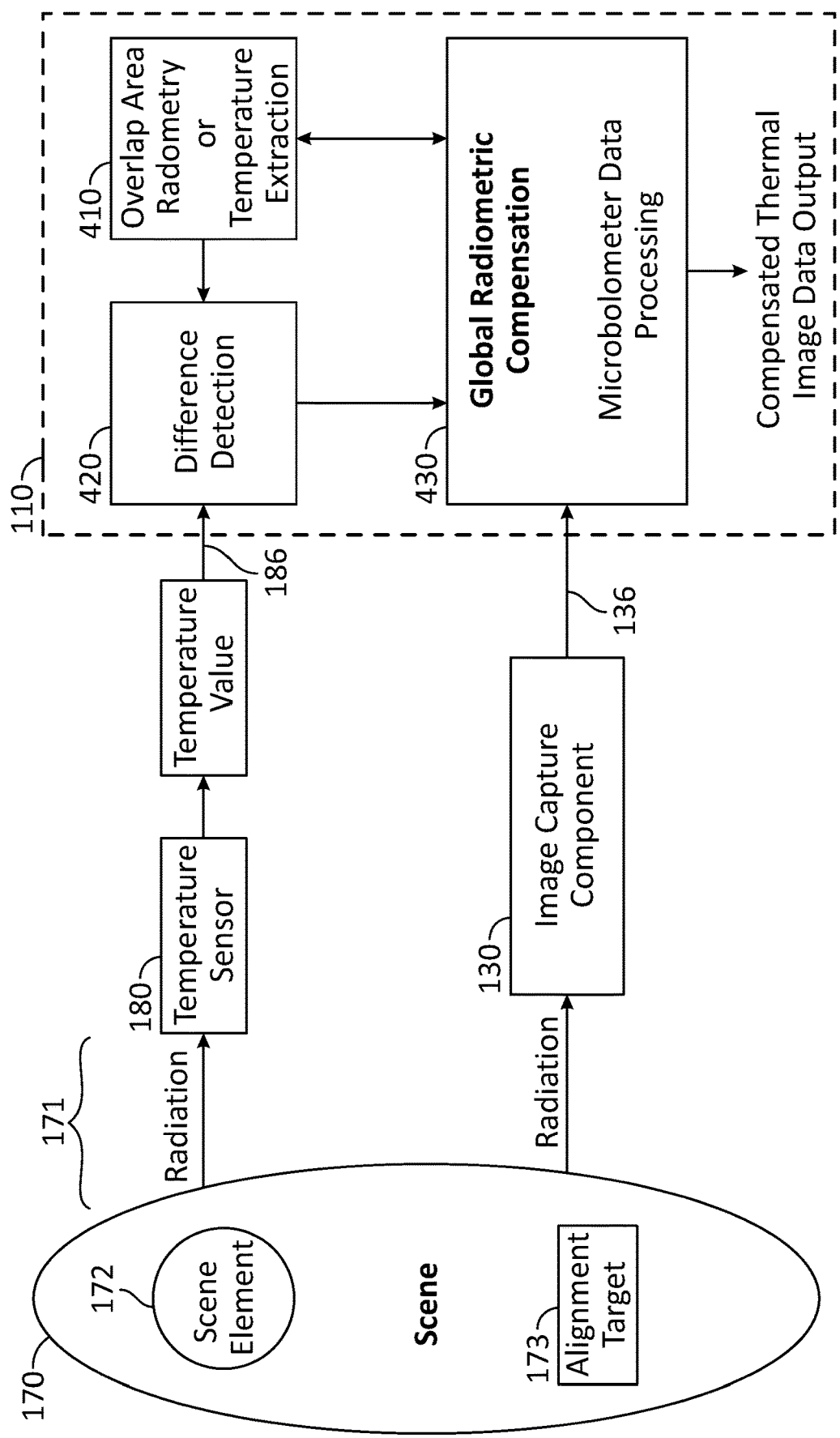
FIG. 4 illustrates an overall flow diagram of calibration operations performed by an imaging system in accordance with an embodiment of the disclosure.

FIG. 4 illustrates an overall flow diagram of calibration operations performed by processing component 110 of imaging system 100 in accordance with an embodiment of the disclosure. As previously discussed with regard to FIG. 1 and further shown in FIG. 4, radiation 171 from scene 170 including scene element 172 is received (e.g., simultaneously in some embodiments) by image capture component 130 and temperature sensor 180.

In response to radiation 171, image capture component 130 captures one or more thermal images with pixel values associated with scene 170 including scene element 172. The captured thermal images are provided to processing component 110 (e.g., through image capture interface component 136 as discussed). Also in response to radiation 171, temperature sensor 180 detects a temperature value associated with scene element 172 which is provided to processing component 110 (e.g., through temperature sensor interface component 186 as discussed).

Various processing performed by processing component 110 is represented by blocks 410, 420, and 430. In block 410, processing component 110 determines a portion of the captured thermal image (e.g., a subset of pixels such as pixels 372 in the example of FIG. 3) corresponding to the FOV 176 of temperature sensor 180.

In block 420, processing component 110 determines a difference between: the temperature value detected by temperature sensor 180; and an initial temperature currently associated with the subset of pixels determined in block 420. The initial temperature may be based on, for example, a preexisting factory calibration associating particular pixel values (or ranges of pixel values) with scene temperatures.

However, as discussed, the performance of infrared sensors 232 can vary over time. As a result, the factory calibration settings may, if left uncorrected, lead to incorrect temperature values associated with the pixel values of captured thermal images.

Accordingly, in block 430, processing component 110 processes the pixel values of captured images to correct for the temperature difference determined in block 420. For example, processing component 110 may apply a local or global correction terms to various pixel values such that they are radiometrically calibrated with the temperature detected by temperature sensor 180. As a result, compensated thermal images may be provided as shown. Further details of the processing performed by processing component 110 is set forth in the discussion of FIG. 5.

Figure 5:
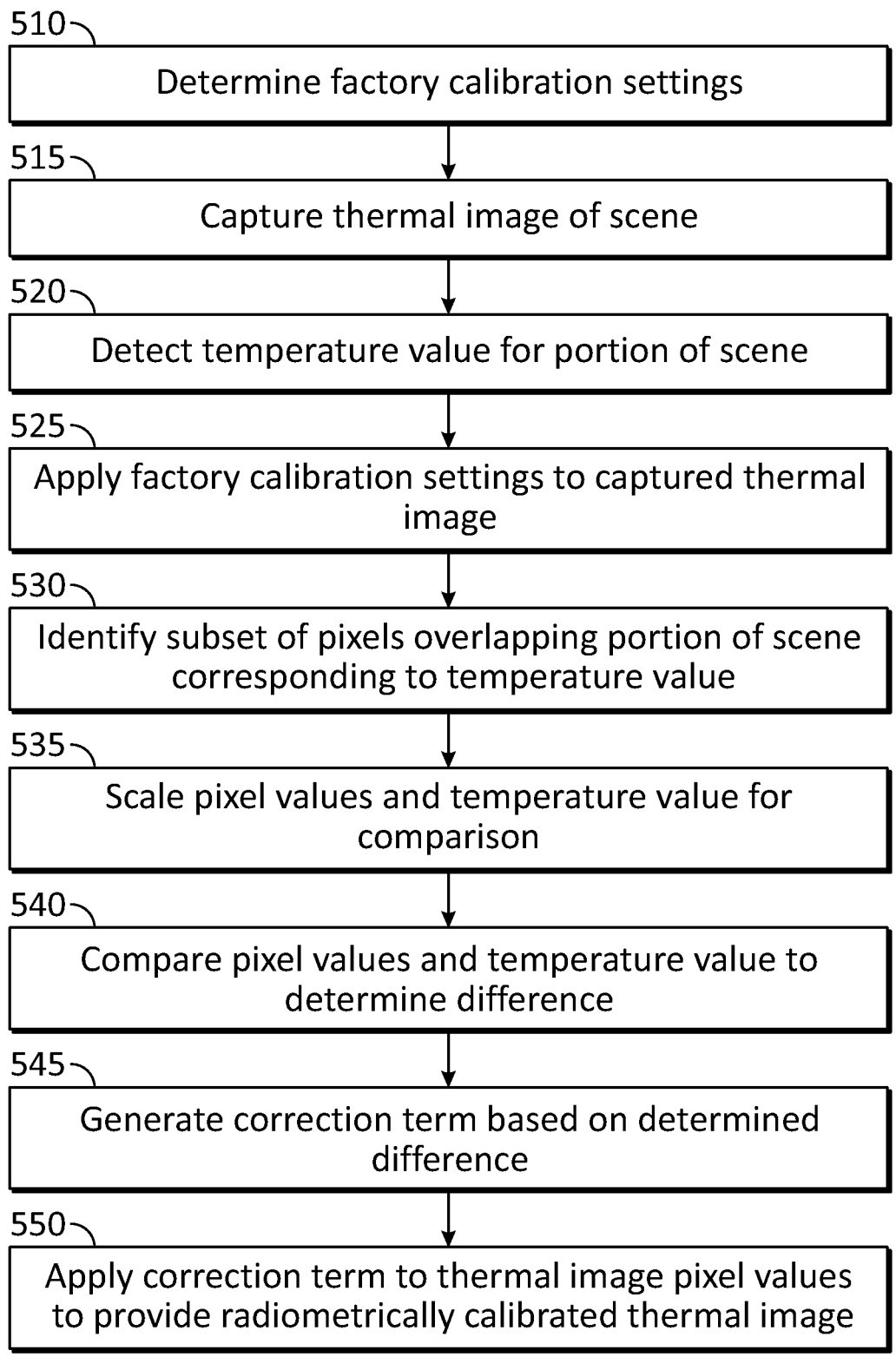
FIG. 5 illustrates a process of calibrating one or more infrared sensors using a temperature sensor in accordance with an embodiment of the disclosure.

FIG. 5 illustrates a process of calibrating one or more of infrared sensors 232 using temperature sensor 180 in accordance with an embodiment of the disclosure. In block 510, factory calibration settings are determined for the individual infrared sensors 232 of image capture component 130. For example, in some embodiments, camera component 101 may be positioned to capture images of one or more uniform black body targets having a known temperatures. As a result, one or more correction terms may be determined for each infrared sensor 232. In some embodiments, different terms may be associated with different temperature ranges to account for variations in performance over a range of temperatures.

Thus, following block 510, a set of calibration settings will have been determined for each infrared sensor 232 such that pixel values resulting from thermal images captured by the infrared sensors 232 will correlate to a corresponding expected scene temperature at the time that image capture component 130 is manufactured. As discussed, the performance of infrared sensors 232 can change over time. Accordingly, additional operations may be performed in the process of FIG. 5 to recalibrate infrared sensors 232 as desired, for example, during use in the field.

In block 515, image capture component 130 captures a thermal image (e.g., example thermal image 300) of scene 170 that includes scene element 172. In block 520, temperature sensor 180 detects a temperature value corresponding to scene element 172. In some embodiments, blocks 515 and 520 may be performed simultaneously in response to radiation 171 received from scene 170 and scene element 172. As a result, the temperature value detected in block 520 will be a contemporaneous reading of the temperature of scene element 172 at the time the image is captured. In other embodiments, blocks 515 and 520 may be performed at different times, particularly in cases where scene element 172 is stationary relative to image capture component 130 and is not varying in temperature.

In block 525, processing component 110 receives the captured thermal image (e.g., through image capture interface component 136) and applies the factory calibration settings to the pixel values of the captured image to provide an initially calibrated image. In this regard, the pixel values of the initially calibrated image will be associated with temperatures in accordance with the initial factory calibrations, but not corrected for possible temperature deviations resulting from performance changes following the manufacture of image capture component 130.

In block 530, processing component 110 identifies a subset of pixels (e.g., pixels 372 in the example of FIG. 3) of the initially calibrated image that overlap a portion of scene 170 corresponding to FOV 176 of temperature sensor 180. As a result, the identified subset of pixels will have pixel values associated with a particular temperature or temperature range as determined by the factory calibration settings.

In block 535, processing component 110 scales the subset of pixel values (identified in block 530) and/or the temperature value (detected in block 520) so they may be compared. For example, in some embodiments, the subset of pixel values may be converted to their associated factory temperature values for comparison with the detected temperature value. In other embodiments, the detected temperature value may be converted to a pixel value corresponding to the detected temperature value. In other embodiments, both the subset of pixel values and the detected temperature value may be converted to another form for comparison.

In block 540, processing component 110 compares the subset of pixel values with the temperature value (e.g., using appropriate scaled values determined in block 535) to determine a difference between the values. This difference corresponds to the difference between: the factory calibrated temperature value associated with the subset of pixel values corresponding to scene element 172; and the actual temperature of scene element 172 detected by temperature sensor 180.

In block 545, processing component 110 generates (e.g., calculates and/or otherwise determines) a pixel value correction term based on the difference determined in block 540. This pixel value offset term corrects the subset of pixel values to updated values that correspond to the actual temperature of scene element 172.

In block 550, processing component 110 applies the pixel value correction term to all pixel values of the captured image. In this regard, if all infrared sensors 232 are generating pixel values that are similarly offset from the actual temperate values of their corresponding portions of scene 170, then applying the pixel value correction term to all pixel values of the captured image will result in a corrected image that is radiometrically calibrated to compensate for performance changes over the previously determined factory calibration settings. In various embodiments, the pixel value correction term may be an offset term (e.g., correction term that is added to or subtracted from pixel values) and/or a gain term (e.g., a correction term that is multiplied with pixel values).

Although the process of FIG. 5 has been discussed in the context of a single thermal image 300 and a single temperature value used to generate a single correction term, other embodiments are contemplated. For example, multiple thermal images and/or multiple temperature values may be used to more precisely determine one or more pixel value correction terms. For example, in some embodiments, the generated pixel value correction terms may be averaged over multiple thermal images and/or multiple temperature values. In some embodiments, different pixel value correction terms may be generated for different temperature ranges (e.g., different targets 172 at different temperatures) to adjust for nonlinear performance of infrared sensors 232 over a range of temperatures.

As discussed, the process of FIG. 5 uses an overlap between the FOV 176 of temperature sensor 180 and pixel subset 372 to determine pixel offset values. In particular, a known alignment of the FOV 176 of temperature sensor 180 relative to the FOV 174 of image capture component 130 can be used to determine this overlap. Various techniques discussed below may be used to determine the alignment and thus the overlap.

Figure 6:
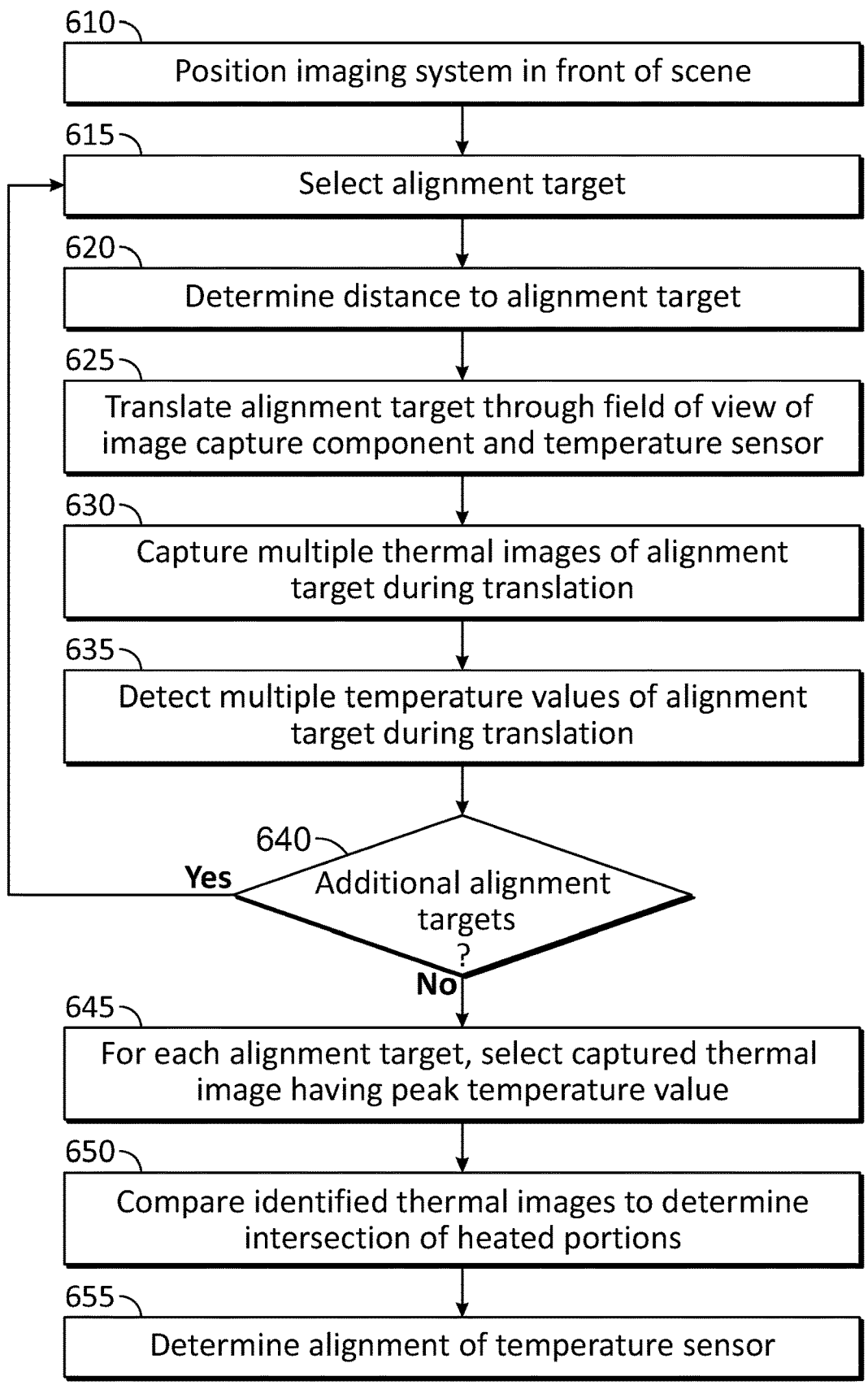
FIG. 6 illustrates a process of determining an alignment of a temperature sensor in accordance with an embodiment of the disclosure.

FIG. 6 illustrates a process of determining an alignment of temperature sensor 180 in accordance with an embodiment of the disclosure. In block 610, imaging system 100 is positioned in front of scene 170. As discussed, one or more alignment targets 173 may be available to be translated through scene 170 (e.g., in the direction of arrow 179).

FIGS. 7A-7B illustrate example alignment targets 173A and 173B that may be used for alignment target 173 to determine an alignment of temperature sensor 180 in accordance with embodiments of the disclosure. In this regard, alignment targets 173A-B include heated portions 700A-B and unheated portions 710A-B. Heated portions 700A-B may be implemented with heated elements that exhibit a temperature greater than that of unheated portions 710A-B and also greater than scene 170. As shown, heated portions 700A-B may be implemented in a pattern that varies over at least two dimensions (e.g., the height and length in this example) alignment targets 173A-B.

In block 615, a first alignment target (e.g., alignment target 173A) is selected. In block 620, a rangefinder (e.g., implemented by sensing components 160 as discussed) determines the distance 175 of alignment target 173A from camera component 101 and temperature sensor 180. In some embodiments, the distance 175 may be repeatedly or continuously updated such that a corresponding value for distance 175 is determined for each thermal image captured and each temperature value detected during the process of FIG. 6. In some embodiments, the distance 175 may be determined through other approaches besides measurement by a rangefinder (e.g., through image processing and/or other techniques).

In block 625, alignment target 173A begins to be translated through scene 170 in the direction of arrow 179 (e.g., by an appropriate external mechanism and/or user manipulation). In this regard, alignment target 173A will move through FOV 174 of image capture component 130 and also through FOV 176 of temperature sensor 180 while the operations of blocks 630 and 635 are performed.

In block 630, during the translation of alignment target 173A, image capture component 130 captures multiple thermal images. FIGS. 8A, 8B, and 8C illustrate example thermal images 800, 810, and 820 captured of alignment target 173A as it moves through FOV 174 in the direction of arrow 179 in accordance with embodiments of the disclosure.

In block 635, also during the translation of alignment target 173A, temperature sensor 180 detects (e.g., captures) temperature values simultaneously with the capturing of the thermal images in block 625. As discussed, FOV 176 of temperature sensor 180 is narrower than FOV 174 of camera component 101. Accordingly, the temperature values detected by temperature sensor 180 will vary depending on whether FOV 176 overlaps with heated portion 700A or unheated portion 710A of alignment target 173A.

Following blocks 630 and 635, processing component 110 will have received thermal images and corresponding temperature values of alignment target 173A for different positions in front of image capture component 136 and temperature sensor 180.

If additional alignment targets remain to be considered (block 640), then the process of FIG. 6 repeats blocks 615 to 635 for the next alignment target. In the current example, blocks 615 to 635 may be repeated for alignment target 173B. FIGS. 9A, 9B, and 9C illustrate example thermal images 900, 910, and 920 captured of alignment target 173B as it moves through FOV 174 in the direction of arrow 179 in accordance with embodiments of the disclosure. After all alignment targets have been considered (block 640), the process of FIG. 6 continues to block 645.

In block 645, processing component 110 selects (e.g., identifies) one of the captured thermal images for each of alignment targets 173A-B that corresponds to the peak (e.g., maximum) simultaneously captured temperature value. For example, if the temperature value detected during the capture of thermal image 810 is higher than those detected during the capture of thermal images 800 and 820, then thermal image 810 may be identified in block 645 for alignment target 173A. Similarly, if the temperature value detected during the capture of thermal image 910 is higher than those detected during the capture of thermal images 900 and 920, then thermal image 910 may be identified in block 645 for alignment target 173B.

In block 650, processing component 110 compares the thermal images identified in block 645 (e.g., thermal images 810 and 910 in this example) to determine an intersection of heated portions 700A and 700B in the thermal images. Because heated portions 700A-B of alignment targets 173A-B exhibit higher temperatures than the remaining unheated portions 710A-B, the highest temperature values detected by temperature sensor 180 during block 635 will occur when its FOV 176 overlaps with each of heated portions 700A-B. Moreover, because heated portions 700A-B extend in different diagonal directions, the intersection of heated portions 700A-B may be used to determine a precise location of FOV 176 within the captured thermal images. For example, FIG. 10 illustrates thermal images 810 and 910 superimposed over each other to identify an intersection 1000 of heated portions 700A and 700B in accordance with an embodiment of the disclosure.

In block 655, processing component 110 determines an alignment of FOV 176 of temperature sensor 180 relative to FOV 174 image capture component 130 based on the intersection determined in block 650. In this regard, because the distance 175 from camera component 101 and temperature sensor 180 to alignment targets 173A-B is known, and the location of the FOV 176 of temperature sensor 180 within captured thermal images captured by camera component 101 for the distance 175 is also known, then the pointing angle 177 corresponding to the center of the FOV 176 of temperature sensor 180 can be determined. Although a horizontal pointing angle 177 is illustrated in FIG. 1, the corresponding vertical pointing angle may be similarly determined. As a result, a precise alignment of temperature sensor 180 can be determined in multiple dimensions relative to scene 170.

Thus, for a given distance 175, processing component can determine a pixel location within the array of infrared sensors 232 corresponding to FOV 176 of temperature sensor 180. Accordingly, the process of FIG. 6 permits processing component 110 to correlate FOV 176 of temperature sensor 180 to one or more particular pixel locations within captured thermal images corresponding to FOV 174 of image capture component 130. These identified pixel locations may be used to identify the overlapping portion of scene 170 corresponding to detected temperature values during block 410 of FIG. 5 and block 530 of FIG. 5.

For example, FIG. 11 illustrates individual pixels 1100 corresponding to individual infrared sensors 232 for thermal images captured at the same distance 175 used for thermal images 810 and 910 in accordance with an embodiment of the disclosure. A particular pixel 1110 (e.g., shaded dark for ease of identification) corresponds to the intersection 1000 shown in FIG. 10 and is the pixel location corresponding to FOV 176 of temperature sensor 180 for distance 175. Although a single pixel 1110 is identified in FIG. 11, a group of multiple pixels may be identified in other embodiments.

In some embodiments, the identified pixel locations may be further adjusted to account for distance. In this regard, block 530 may further include determining the distance to scene element 172 in the manner discussed with regard to block 620 and extrapolating FOV 176 along one or more determined pointing angles.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more computer readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

What is claimed is:

1. A method comprising:
   capturing a thermal image of a scene by an array of infrared sensors of an imaging system, wherein the thermal image comprises a plurality of pixel values;
   detecting, by a non-contact temperature sensor, a temperature value associated with a portion of the scene;
   determining an alignment of the temperature sensor relative to the array;
   identifying a correspondence between the portion of the scene and a subset of the pixel values based on the alignment of the temperature sensor relative to the array;
   comparing the subset of pixel values with the detected temperature value;
   generating a correction term based on the comparing; and
   applying the correction term to at least the subset of pixel values to radiometrically calibrate the subset of pixel values.

2. The method of claim 1, wherein the applying comprises applying the correction term to all of the pixel values of the thermal image to radiometrically calibrate all of the pixel values.

3. The method of claim 1, wherein the correction term is at least one of an offset correction term and/or a gain correction term.

4. The method of claim 1, further comprising repeating the capturing, detecting, comparing, and generating to generate a plurality of correction terms associated with different temperatures.

5. The method of claim 1, wherein:
   the imaging system further comprises the temperature sensor.

6. The method of claim 1, wherein the correspondence is based on at least a distance from the imaging system to the portion of the scene and the alignment of the temperature sensor relative to the array.

7. The method of claim 1, wherein the determining comprises:
   translating a plurality of alignment targets across a field of view of the array;
   capturing, by the array during the translating, a plurality of thermal images each associated with at least one of the alignment targets;
   detecting, by the temperature sensor during the translating, a plurality of temperature values each associated with at least one of the thermal images; and
   processing the thermal images and the temperature values to determine the alignment of the temperature sensor relative to the array.

8. The method of claim 7, wherein the processing comprises:
   selecting a first one of the thermal images associated with a first peak temperature value of a first one of the alignment targets;
   selecting a second one of the thermal images associated with a second peak temperature value of a second one of the alignment targets; and
   comparing the first and second thermal images to determine an intersection between the first and second alignment targets.

9. The method of claim 8, wherein:
the first and second alignment targets comprise heated portions arranged in corresponding first and second patterns; and
the intersection comprises an intersection between the first and second patterns in the first and second images.

10. The method of claim 1, wherein the infrared sensors are microbolometers, the temperature sensor is a pyrometer, and the subset of pixel values is a single pixel value.

11. A system comprising:
an array of infrared sensors configured to capture a thermal image of a scene, wherein the thermal image comprises a plurality of pixel values;
a non-contact temperature sensor configured to detect a temperature value associated with a portion of the scene;
a memory component storing machine-executable instructions; and
a processor configured to execute the instructions to cause the system to:
determine an alignment of the temperature sensor relative to the array,
identify a correspondence between the portion of the scene and a subset of the pixel values based on the alignment of the temperature sensor relative to the array,
compare the subset of pixel values with the detected temperature value,
generate a correction term based on the comparing, and
apply the correction term to at least the subset of pixel values to radiometrically calibrate the subset of pixel values.

12. The system of claim 11, wherein the processor is configured to execute the instructions to cause the system to apply the correction term to all of the pixel values of the thermal image to radiometrically calibrate all of the pixel values.

13. The system of claim 11, wherein the correction term is at least one of an offset correction term and/or a gain correction term.

14. The system of claim 11, wherein the processor is configured to execute the instructions to cause the system to generate a plurality of correction terms associated with different temperatures in response to a plurality of thermal images captured by the array and a plurality of temperature values detected by the temperature sensor.

15. The system of claim 11, wherein the correspondence is based on a distance from the imaging system to the portion of the scene and the alignment of the temperature sensor relative to the array.

16. The system of claim 11, wherein:
the array is configured to capture a plurality of thermal images each associated with at least one of a plurality of alignment targets translated across a field of view of the array;
the temperature sensor is configured to detect a plurality of temperature values each associated with at least one of the thermal images; and
the processor is configured to execute the instructions to cause the system to process the thermal images and the temperature values to determine the alignment of the temperature sensor relative to the array.

17. The system of claim 16, wherein the processor is configured to execute the instructions to cause the system to:
select a first one of the thermal images associated with a first peak temperature value of a first one of the alignment targets;
select a second one of the thermal images associated with a second peak temperature value of a second one of the alignment targets; and
compare the first and second thermal images to determine an intersection between the first and second alignment targets to determine the alignment of the temperature sensor relative to the array.

18. The system of claim 17, wherein:
the first and second alignment targets comprise heated portions arranged in corresponding first and second patterns; and
the intersection comprises an intersection between the first and second patterns in the first and second images.

19. The system of claim 11, wherein the infrared sensors are microbolometers, the temperature sensor is a pyrometer, and the subset of pixel values is a single pixel value.

20. The system of claim 11, wherein the system is a portable thermal imaging camera.

* * * * *